United States Patent
Martin et al.

(10) Patent No.: US 6,282,371 B1
(45) Date of Patent: Aug. 28, 2001

(54) DEVICES FOR REDUCING EMISSIONS, AND METHODS FOR SAME

(76) Inventors: Richard J. Martin, 1377 Poe La., San Jose, CA (US) 95130; Bradley L. Edgar, 260 N. #3rd St. Number C, San Jose, CA (US) 95112; Dorriah L. Page, 1151 Corte Barroso, Camarillo, CA (US) 93010; Partha P. Paul, 7520 Potranco Rd. Number 414, San Antonio, TX (US) 78251

( * ) Notice: Subject to any disclaimer, the term of this patent is extended or adjusted under 35 U.S.C. 154(b) by 0 days.

(21) Appl. No.: 09/109,777

(22) Filed: Jul. 2, 1998

(51) Int. Cl.[7] .................................................... F24H 1/10
(52) U.S. Cl. ........................... 392/490; 165/170; 422/168
(58) Field of Search ................................... 422/168, 171, 422/174, 176, 177, 179; 165/164, 165, 166, 167, 170, 168; 392/490

(56) References Cited

U.S. PATENT DOCUMENTS

| | | | |
|---|---|---|---|
| 1,812,341 | 6/1931 | Jaeger | 122/4 D |
| 2,795,054 | 6/1957 | Bowen, III | 34/35 |
| 2,976,853 | 3/1961 | Hunter et al. | 122/4 |
| 3,661,497 | 5/1972 | Castelluci et al. | 431/7 |
| 3,769,922 | 11/1973 | Furlong et al. | 110/28 J |
| 3,807,090 | 4/1974 | Moss | 48/128 |
| 3,810,732 | 5/1974 | Koch | 431/7 |
| 3,888,193 | 6/1975 | Kishigami et al. | 110/8 F |
| 3,900,554 | 8/1975 | Lyon | 423/235 |
| 3,942,264 | 3/1976 | Zenkner | 34/35 |
| 4,047,876 | 9/1977 | Rice | 431/7 |
| 4,252,070 | 2/1981 | Benedick | 110/211 |
| 4,259,088 | 3/1981 | Moss | 48/212 |
| 4,284,401 | 8/1981 | Tatebayashi et al. | 431/7 |
| 4,355,504 | 10/1982 | Liu et al. | 60/275 |
| 4,380,149 | 4/1983 | Ludecke | 60/274 |
| 4,400,356 | 8/1983 | McVay et al. | 422/171 |
| 4,475,884 | 10/1984 | Shang et al. | 431/170 |
| 4,529,374 | 7/1985 | Malik et al. | 431/7 |
| 4,627,812 | 12/1986 | Kelly et al. | 431/7 |
| 4,643,667 | 2/1987 | Fleming | 431/7 |
| 4,646,660 | 3/1987 | Björkman et al. | 110/210 |
| 4,688,495 | 8/1987 | Galloway | 110/250 |
| 4,702,075 | 10/1987 | Jenny | 60/274 |
| 4,716,844 | 1/1988 | Koch | 110/341 |
| 4,741,690 | 5/1988 | Heed | 431/7 |
| 4,785,768 | 11/1988 | Brown et al. | 122/4 |
| 4,807,695 | 2/1989 | Ward | 165/4 |
| 4,823,711 | 4/1989 | Kroneberger et al. | 110/236 |
| 4,828,481 | 5/1989 | Weil et al. | 431/7 |
| 4,838,782 | 6/1989 | Wills | 431/166 |

(List continued on next page.)

OTHER PUBLICATIONS

Burke, S.P. et al., "Diffusion Flames", First Symposium (International) on Combustion, 1954, 2–11.

"California could end heavy diesel vehicle sales", *Oil and Gas J.*, 1994, 42 and 44.

(List continued on next page.)

*Primary Examiner*—Teresa Walberg
*Assistant Examiner*—Thor Campbell
(74) *Attorney, Agent, or Firm*—Luedeka,Neely & Graham PC

(57) ABSTRACT

An integrated oxidation-reduction process whereby a thermal oxidation zone and a NOx reduction zone are incorporated into a single device. A thermal oxidation and catalytic reduction system having a multi-spiral, heat recuperative configuration and including a lean NOx catalytic section disposed in the low-temperature regions is disclosed, as is a corresponding method. The catalyst may be disposed on the oxidizer walls or on a matrix of porous inert media disposed in the spiral passages of the oxidizer. A film-injection technique to selectively provide reactants to the catalyst surface is also disclosed. The catalyst may be limited to a concave portion of a sidewall to diminish boundary layer separation of the reactants.

27 Claims, 8 Drawing Sheets

U.S. PATENT DOCUMENTS

| | | | |
|---|---|---|---|
| 4,911,894 | * 3/1990 | Retallick et al. | 422/174 |
| 4,941,415 | 7/1990 | Pope et al. | 110/235 |
| 4,953,512 | 9/1990 | Italiano | 122/4 |
| 4,969,328 | 11/1990 | Kammel | 60/275 |
| 4,974,530 | 12/1990 | Lyon | 110/346 |
| 5,059,575 | 10/1991 | Jorgensen et al. | 502/304 |
| 5,165,884 | 11/1992 | Martin et al. | 431/7 |
| 5,320,518 | 6/1994 | Stilger et al. | 431/7 |
| 5,426,936 | 6/1995 | Levendis et al. | 60/278 |
| 5,533,890 | 7/1996 | Holst et al. | 431/5 |
| 5,547,650 | 8/1996 | Edgar et al. | 423/235 |
| 5,567,390 | 10/1996 | Cleary | 422/111 |
| 5,601,790 | 2/1997 | Stilger et al. | 422/168 |
| 5,635,139 | 6/1997 | Holst et al. | 422/108 |
| 5,637,283 | 6/1997 | Stilger et al. | 423/245.1 |
| 5,650,128 | 7/1997 | Holst et al. | 423/240 R |

OTHER PUBLICATIONS

Control of Air Pollution from New Motor Vehicles and New Motor Engines, *Federal Register,* 1993, 58(55), 15781–15802.

"Focus on Industry Solutions for Exhaust Pollution Control", *Automotive Engineer,* 1994, pp. 18,20,22,24,26,27,28, 29.

Haynes, B.S. et al., "Soot Formation", *Progress in Energy and Combustion Science,* 1990, 7, 229–273.

Kahair, M.K. et al., "Design and Development of Catalytic Converters for Diesels", SAE paper 921677, 1992, 199–209.

Keeney. T.R.E., *Auto Emissions,* 1995, 5, 4 Sheets.

Wagner et al., "SCR succeeds at Logan Generating Plant", *Power Engin.,* 1997, 28–32.

Paul, P.P. et al., "Development of a Lean–$NO_x$ Catalyst Containing Metal–Ligand Complex Impregnated Molecular Sieves", *SAE Technical Paper Series,* No. 962050, International Fall Fuels & Lubricants Meeting & Exposition, San Antonio, TX, Oct. 14–17, 1996, 91–98.

U.S. application No. 08/921,815, Martin et al., filed Sep. 2, 1997.

U.S. application No. 08/922,176, Martin et al., filed Sep. 2, 1997.

U.S. application No. 08/922,189, McAdams et al., filed Sep. 2, 1997.

U.S. application No. 09/072,851, Edgar et al, filed May 5, 1998.

* cited by examiner

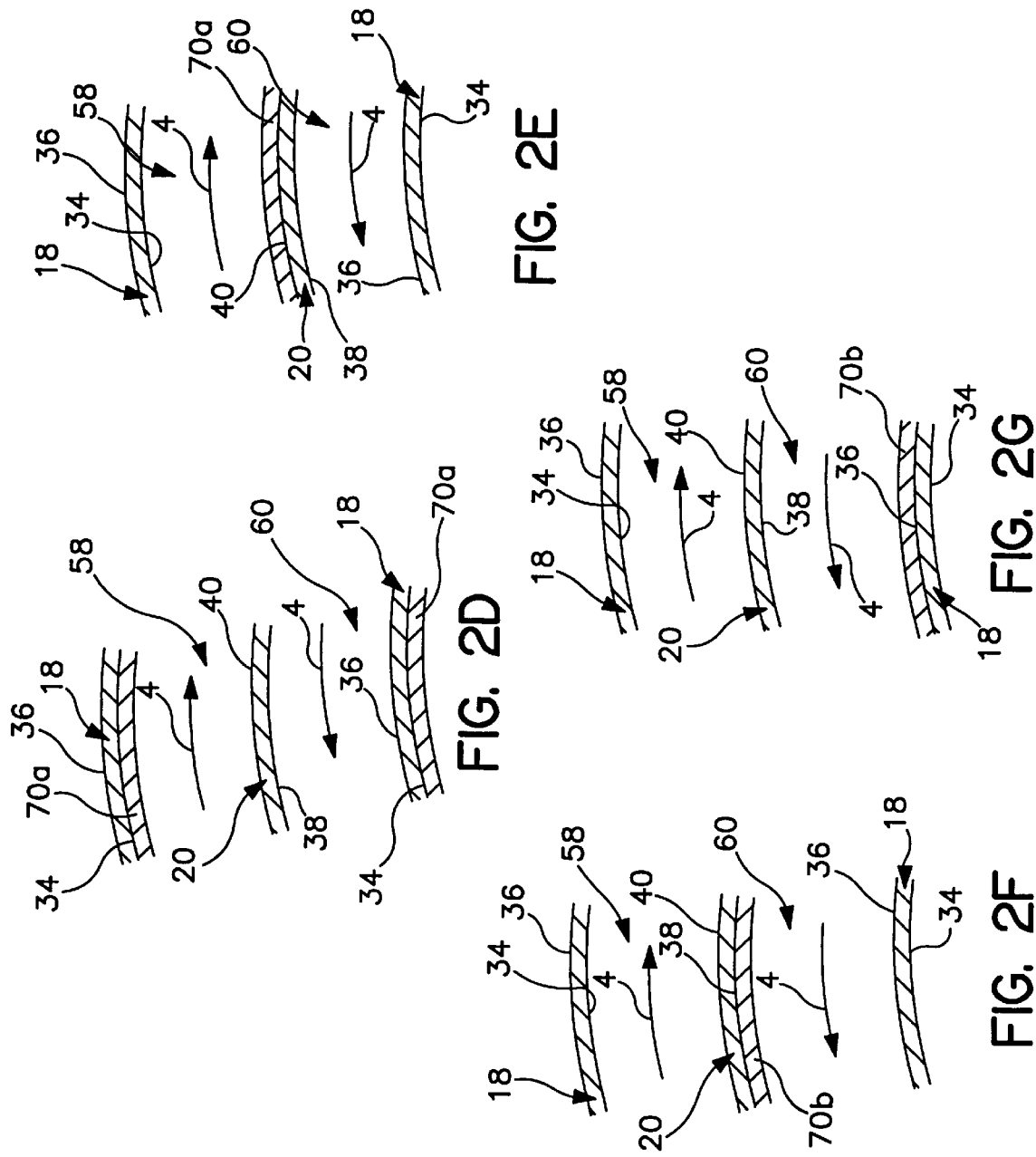

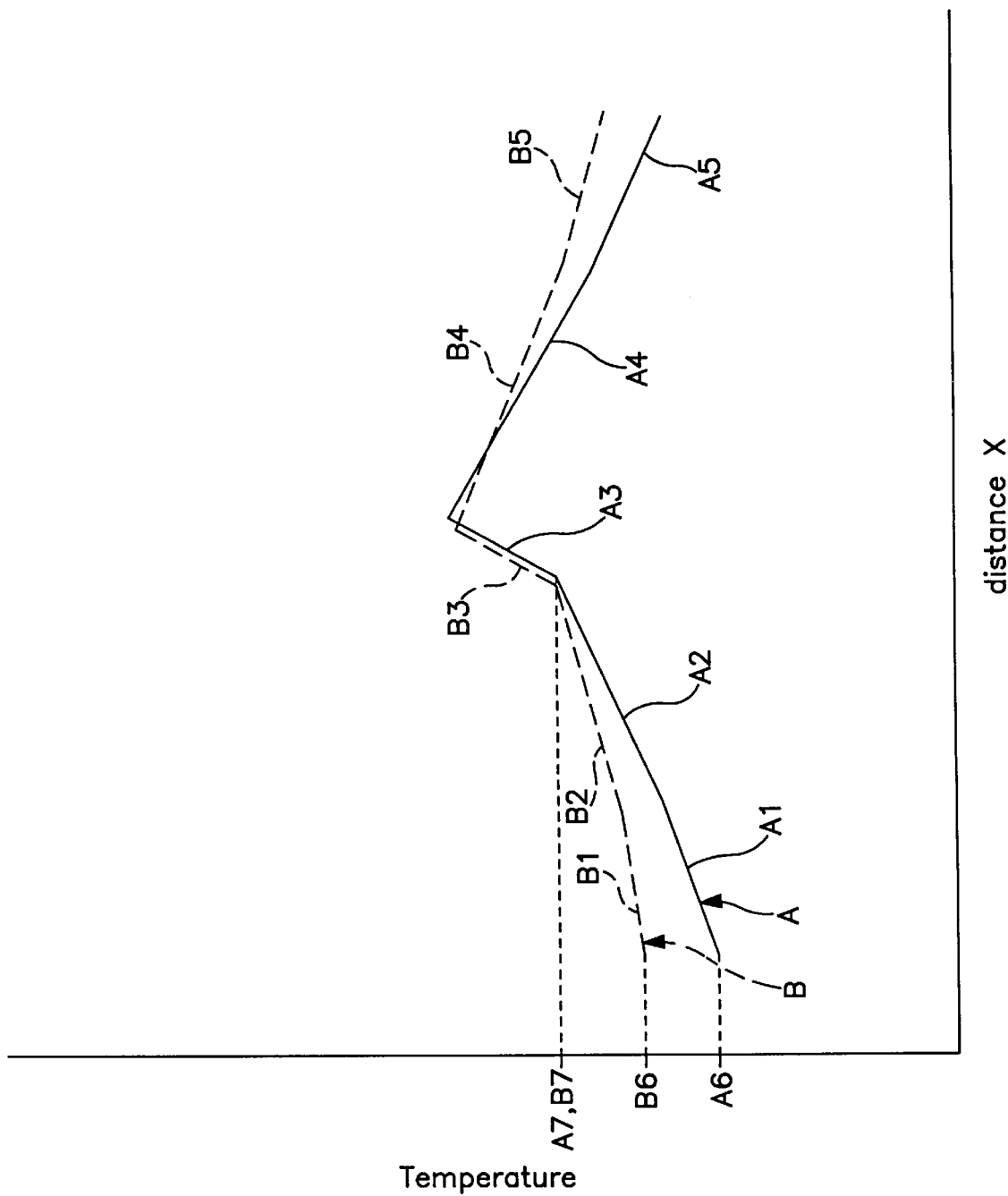

DEVICES FOR REDUCING EMISSIONS, AND METHODS FOR SAME

FIELD OF THE INVENTION

This invention relates to the reduction of nitrogen oxides and the thermal oxidation of organics, and more particularly, to a device and method for the reduction of nitrogen oxides and the thermal oxidation of organics in a net oxidizing environment of a gas and particulate matter stream from industrial and vehicle exhaust.

BACKGROUND OF THE INVENTION

Destruction or conversion of atmospheric pollutants in industrial gas streams and internal combustion engine exhaust streams has been a long-standing research and development goal. Such atmospheric pollutants include products of incomplete combustion, such as carbon monoxide and unburned hydrocarbons, oxides of nitrogen ["NOx"], and carbonaceous particulate matter ["PM"].

Lean-burning engines, such as diesel engines and lean-burning gasoline or natural gas engines, often emit levels of pollutants above regulatory limits. In response to air quality regulations, vehicle manufacturers employ pollution control devices in internal combustion engine exhaust systems to reduce these emissions. Traditional gasoline engine pollution control devices employ a ceramic honeycomb monolith or a packed bed of pellets having a coating of a noble metal catalyst. Such devices catalyze the reactions of carbon monoxide and unburned hydrocarbons with oxygen, typically at approximately 260° C. to 427° C. (500° F. to 800° F.). Other devices employ catalysts that also catalyze the reaction of oxides of nitrogen. Unfortunately, two factors render such catalytic devices alone insufficient for treating vehicle engine exhaust (especially diesel engine) and similar industrial emissions. First, the catalytic devices are ineffective at destroying PM, which is present in engine gas streams, especially those from diesel engines. Second, the PM and other particulates deposit on the monolith, thereby preventing gaseous constituents from reaching the catalytic material, or possibly deactivating or poisoning the catalyst. In general, conventional three-way-catalysts fail to reduce NOx under lean-burn (that is, oxygen-rich) conditions common to many internal combustion engines.

Internal combustion engines are the subject of regulations limiting NOx emissions. The simultaneous emission limits for both particulate matter and NOx presents a unique problem because the two pollutants typically have an inverse relationship in engine exhaust. Internal combustion engines generally can be configured and tuned to produce an exhaust stream having low PM and high NOx concentrations or, alternatively, high PM and low NOx concentrations. Traditionally, engines that employ oxidation catalyst devices may be adjusted to minimize NOx formation because of the catalysts' inability to reduce NOx. Such adjustments may compromise engine efficiency and performance.

Although not generally employed in reducing NOx emissions from internal combustion engines, various techniques exist for reducing NOx emissions from gas streams in other applications. One technique for reducing NOx emissions is selective catalytic reduction (SCR), which reduces NOx in the presence of a reducing agent, such as of ammonia ($NH_3$), over a catalyst. Typically, selective catalytic NOx reduction is employed with exhaust stream temperatures in the range of 288° C.–427° C. (550° F.–800° F.). SCR catalysts have the limitations discussed herein above.

Another approach for removing NOx is selective non-catalytic reduction (SNCR), which employs a chemical that selectively reacts, in the gas phase, with NOx in the presence of oxygen at a temperature greater than 621° C. (1150° F.). Chemical NOx reduction agents used in such processes include ammonia ($NH_3$), urea ($NH_2CONH_2$), cyanuric acid $(HNCO)_3$, iso-cyanate, hydrazine, ammonium sulfate, atomic nitrogen, melamine, methyl amines, and bi-urates.

SUMMARY OF THE INVENTION

It is an object of the present invention to provide a system and method or reducing pollutant emissions from internal combustion engines and industrial exhaust gas streams. Specifically, an object of the present invention is to provide a system and method for reducing NOx, and oxidizing PM and oxidizable constituents in an engine or industrial exhaust stream. It is an object to provide such a system and method in a single, compact device, especially one suitable for use in a mobile vehicle engine.

It is another object of the present invention to provide a device and method for the integrated, substantially-simultaneous oxidation and reduction, especially thermal oxidation of organics and catalytic reduction of NOx, of an exhaust gas stream.

It is a further object of the present invention to provide a system and method for reducing NOx emissions from an engine exhaust stream under lean-burn (that is, oxygen-rich) conditions.

It is yet a further object of the present invention to provide a thermal oxidation and catalytic reduction system having a catalytic surface to reduce NOx under lean-burn conditions.

It is yet a further object of the present invention to provide film injection techniques to enhance contact between a reactant and a catalyst.

It is yet a further object of the present invention to provide techniques for the injection of supplementary fuel into a system for the thermal oxidation of organics and catalytic NOx reduction in such a manner that the performance of the NOx reduction catalyst is enhanced.

According to the present invention, a thermal oxidation and catalytic reduction system arranged in a compact, multi-spiral, recuperative configuration is provided that includes two interspaced, coiled sidewalls that form a spiral inlet passage and a spiral outlet passage, and a central chamber. A thermal oxidation zone, which is preferably disposed in the central chamber, may be located between the inlet and outlet (that is, entrance and exit) passages, which form a spiral, counter-current heat exchanger. A matrix of porous inert media may be disposed within each one of the spiral passages and in the central chamber. The oxidation reaction zone, which is in flow communication with the spiral inlet passage and spiral outlet passage, receives heat primarily by convection from the oxidized gases and loses heat primarily by radiation to the matrices, which are in intimate contact with the gas stream.

The thermal oxidation and catalytic reduction system utilizes a catalytic surface to reduce NOx. Preferably a lean-NOx catalyst is employed in the appropriate regions of the thermal oxidation and catalytic reduction system—that is, proximate the inlet (for conditions in which the inlet gas stream is within or belowthe range at which the particular catalyst may be effective) and the outlet. The catalytic surface may be disposed either on the sidewalls forming the spiral passages, on the media, or in a combination of the media and sidewalls. In the embodiment in which the catalytic surface is disposed on one or more sidewalls, the matrix may be omitted from the passage adjacent to the catalytic surface.

The matrices foster stable oxidation of the reacting gas at low temperatures (for example 788° C.–1093° C. (1450° F.–2000° F.)) within the reaction zone of a thermal oxidizer portion of the present system) compared with premixed flames. Thus, the system according to the present invention diminishes the formation of oxides of nitrogen. Further, the matrices provide a highly radiative environment and long residence times, which promote the destruction of gas phase organics, CO, and PM. Further, the geometry of the present invention provides regions that have temperature ranges that are well-suited for a wide variety of NOx reduction techniques. Specifically, the relatively smooth temperature profile of the gas stream within the spiral passages, compared with combustion processes using (for example) premixed flames, provides relatively long residence times within a wide range of temperatures to enable the present invention to employ a broad range of emission control techniques, especially those relating to NOx reduction. Further, the present invention, because of the stable oxidation conditions created therein, is well-suited to the wide variations in flow rate and temperature (approximately 70° C. to 600° C.) common to engine exhaust streams.

According to another aspect of the present invention, a thermal oxidizer is integrated with a lean-NOx catalyst that utilizes a reducing agent or reactant stream, which includes, among other constituents, hydrogen, hydrocarbons, and carbon monoxide, to chemically reduce NOx to diatomic nitrogen ["$N_2$"]. The integration of the oxidation process and the lean-NOx reduction process enables the reducing agent both to reduce NOx and to provide supplemental fuel to enhance the oxidation process, as well as providing a compact system.

In another aspect of the present invention, a thermal oxidation and catalytic reduction system is provided having a thermal oxidation zone, a catalytic surface disposed on the concave surfaces of the sidewalls, and film-injection means to supply reactants (especially hydrogen, hydrocarbons, and carbon monoxide) to the catalytic surface in greater concentration than if the reactants were premixed in the gas stream. The concave surfaces of the sidewalls are the preferred substrate for the catalytic surface to avoid boundary layer separation of the gas stream over the convex surface. The effectiveness and performance of the catalytic reduction of NOx may thus be enhanced. The film injection for the purpose of enhancing effectiveness of lean-NOx catalysts is preferably employed in the exterior portions (defined angularly) of the sidewalls.

The film-injection also provides cooling to the catalytic surface, thereby enabling the catalytic surface to be disposed further into the thermal oxidation and catalytic reduction system and yet operate within its optimum temperature range. The resulting augmented catalytic surface area may provide increased NOx reduction without increasing oxidizer size.

BRIEF DESCRIPTION OF THE DRAWINGS

FIGS. 2A through 2G are views of a section of the thermal oxidation and catalytic reduction system of FIG. 1 showing various arrangements of the catalytic surface;

FIG. 7 is a typical temperature profile of the gas stream according to the embodiment of the present invention shown in FIG. 1.

DETAILED DESCRIPTION OF THE PREFERRED EMBODIMENTS

Figure 1:
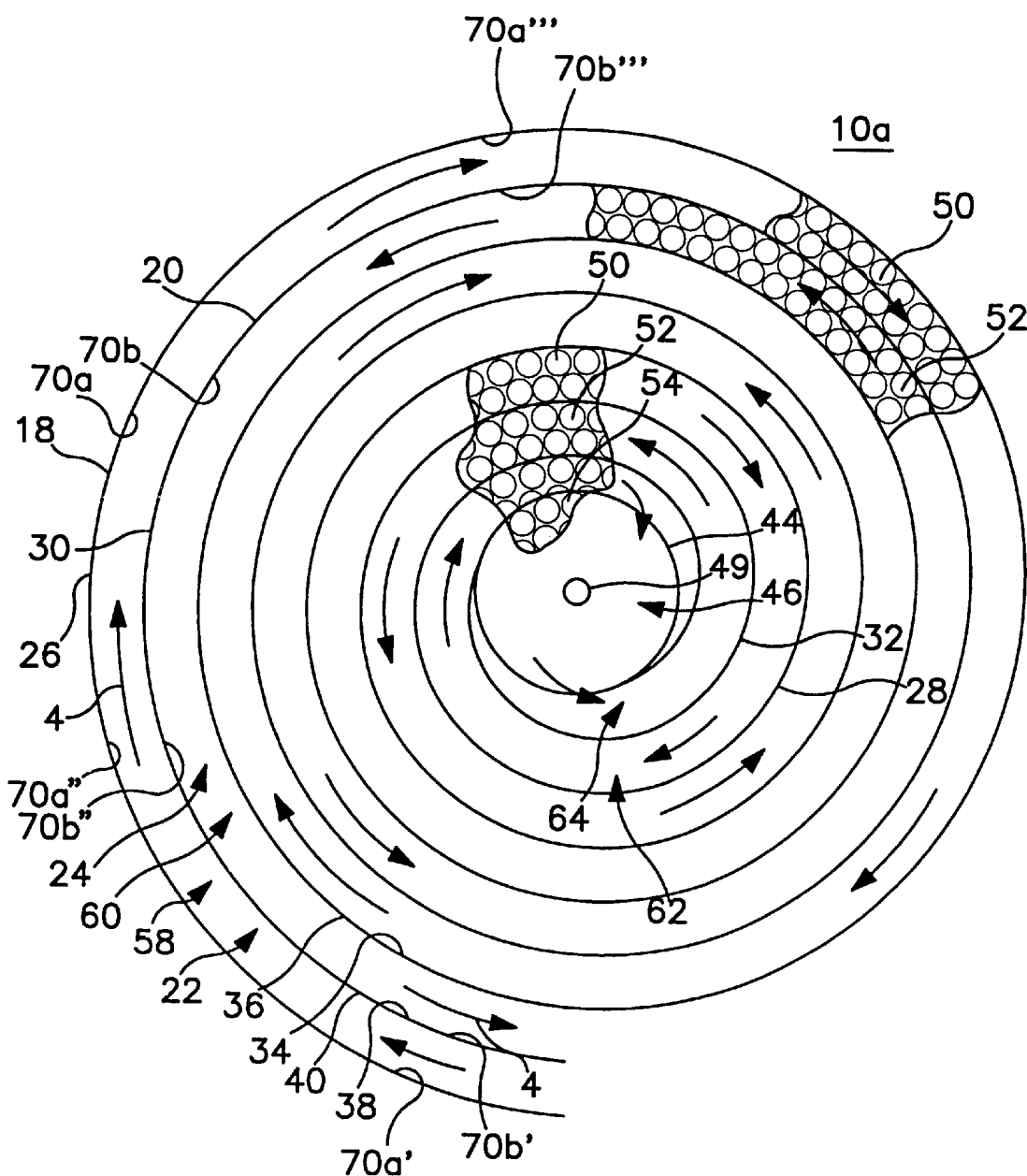
FIG. 1 is a schematic view of the thermal oxidation and catalytic reduction system according to an embodiment of the present invention.

Referring to FIG. 1 to illustrate a first embodiment of the present invention, a thermal oxidation and catalytic reduction system 10a comprises a first coiled sidewall 18 that is interspaced with a second coiled sidewall 20 to form a spiral inlet passage 22 and a spiral outlet passage 24. The first sidewall 18 forms an exterior portion 26 and an interior portion 28. The second sidewall 20 forms an exterior portion 30 and an interior portion 32. The general configuration of such a spiral device may be broadly referred to as as "swiss roll." The terms "exterior portion" and "interior portion," as used to define portions of the sidewalls herein and in the appended claims, refer to angular portions of the sidewalls such that the exterior portion generally has a greater radius of curvature than the interior portion. The term exterior portion is further defined below.

The first sidewall 18 and the second sidewall 20 each have a concave surface 34 and a concave surface 38, respectively, which each face the center of thermal oxidation and catalytic reduction system 10a, and a convex surface 36 and a convex surface 40, respectively, which each face away from the center of the thermal oxidation and catalytic reduction system 10a. A cylinder 44 is disposed near the center of thermal oxidation and catalytic reduction system 10a to form a central chamber 46 having a heating means 49 disposed therein. Alternatively, rather than being formed by a cylinder, a central chamber may be formed between spiral, spaced-apart, opposing ends of sidewalls, as shown in co-pending U.S. patent application Ser. No. 09/072,851, entitled "A Device for Thermally Processing a Gas Stream, and Method for Same," which is incorporated herein by reference in its entirety.

Within the spiral inlet passage 22 is an inlet passage matrix 50 of porous inert media; within the spiral outlet passage 24 is an outlet passage matrix 52 of porous inert media; and within the central chamber 46 is a central chamber matrix 54 of porous inert media. Matrices 50, 52, and 54 are shown in FIG. 1 in cut-away sections of the thermal oxidation and catalytic reduction system 10a for clarity. Specifically, matrix 50, matrix 52, and matrix 54 each comprise a porous bed of solid, heat-resistant media through which a gas stream 4 passes. The present invention broadly encompasses matrices 50, 52, and 54 in an combination. For example, matrices 50 and 52 may be wholly omitted from their respective passages (that is, only the central chamber 46 has a matrix); matrix 50 may be omitted from all or a potion of spiral inlet passage 22; matrix 52 may be omitted from all or a portion of spiral outlet passage 24; matrices 50 and 52 may be partially omitted from their respective passages (that is, the central chamber 46 and portions of the passages 22 and 24 have matrices); matrix 54 may be omitted from a portion of central chamber 46 (that is, all or portions of spiral inlet passage 22 and/or spiral outlet passage 24—including any combination thereof—have matrices 50 and 52, respectively, and a portion of central chamber 46 has matrix 54).

The media of matrices 50, 52, and 54 encompass a bed of any ceramic, metal, or other heat-resistant media, including: metal wool, balls, chunks, granules (preferably approximately 0.25" to 1"" diameter for the balls, chunks, or granules); saddles, preferably approximately 0.5" to 1.5" nominal size; pall rings; foam, preferably having a void fraction of approximately 90% and about ten to thirty pores per inch; and honeycomb. Metal wool or foam are preferred. Regardless of the type or material of the media, interstitial diameters of approximately 0.125" to 1.0" are preferred.

Although the Figures generally use balls to represent the media, the present invention encompasses any combination of the above or other types and sizes of media, whether used separately or in combination, and whether randomly or structurally arranged. Further, the media may include an engineered matrix portion that has two or more flow control portions. The materials of the media are chosen according to their heat transfer properties. The size, composition, and material selections are determined to obtain a desired overall heat transfer and catalytic reaction characteristic. U.S. patent application Ser. No. 08/921,815, entitled "Matrix Bed For Generating Non-Planar Reaction Wave Fronts and Method Thereof", filed Sep. 2, 1997, and U.S. patent application Ser. No. 08/922,176, entitled "Method of Reducing Internal Combustion Engine Emissions, and System for Same," filed Sep. 2, 1997, which are each incorporated herein by reference in their entireties, describe the engineered matrix and the media in greater detail.

Further, co-pending U.S. patent application Ser. No. 09/072,851 describes aspects and features of a spiral, thermal processing device, including, for example, devices and methods for controlling a thermal oxidizer, heating means 49, means for providing inlet and outlet devices, and the like, that may be applied to the present invention. Heating means, and operating and control techniques are also described in U.S. patent application Ser. No. 08/922,176.

Spiral inlet passage 22 and spiral outlet passage 24, because of the oxidation reaction occurring preferably within the central chamber 46, generally form an inlet passage low temperature region 58, an outlet passage low-temperature region 60, an inlet passage high-temperature region 62, and an outlet passage high temperature region 64.

According to one aspect of the present invention, a catalytic surface 70a may be disposed on first sidewall 18 in the inlet passage low-temperature region 58, and another catalytic surface 70b may be disposed on second sidewall 20 in the outlet passage low-temperature region 60. Catalytic surfaces 70a and 70b preferably are disposed proximate the exterior ends of the inlet passage 22 and/or the outlet passage 24, respectively, at locations in which the catalytic surfaces 70a and 70b would contact gases near the optimum catalytic temperature range for the catalyst formulation. The term "low-temperature region," as used herein and in the appended claims, refers to a portion of the thermal oxidation and catalytic, reduction system 10a that corresponds to a temperature range within which a lean-NOx catalyst may be operative to catalytically reduce NOx. It is understood that the "low-temperature region" may be proximate the inlet of the spiral inlet passage 22, proximate the outlet of the spiral inlet passage 24, or within either passage. Further, it is understood that the term "exterior portion," when used to refer to portions of a sidewall, also generally refers to the region of the sidewall having a temperature range within which a lean-NOx catalyst may be operative to catalytically reduce NOx.

The temperature range of the low-temperature regions (that is, the regions within the device that the catalytic surface is disposed) may be chosen, in part, according to the optimum operating temperature range of the catalyst, the temperature at which the rate of creation of NOx from the fuel equals the rate at which NOx is reduced (which may set an upper effective temperature limit), mechanical properties of the catalytic material and its substrate, and like characteristics of the particular application. Catalytic surfaces 70a and 70b (as well as surface 70c, which will be discussed below) preferably are formed of a catalyst material suitable for low-temperature reduction of NOx in lean, gasoline or diesel engine exhaust (or that from a similar industrial process). Although any suitable catalyst may be employed, a lean-NOx catalyst is preferred. An example of such a lean-NOx catalyst is one that incorporates ircn (II)-complex impregnated molecular sieves and is further treated with $[Pd(NH_3)_4]CL_2$—as described in "Development of a Lean-NOx Catalyst Containing Metal-Ligand Complex Impregnated Molecular Sieves," Paul, et al., SAE Technical Paper Series 962050 (1996). The molecular sieve may, for example, comprise the type MCM-41 available from Mobil Oil Corp. Such a catalyst has an optimum effectiveness when operating at a temperature of approximately 288° C. to 427° C.

FIGS. 2A through 2G show various configurations of catalytic surfaces 70a and 70b on a section of sidewall 18 and/or sidewall 20 in the low-temperature regions 58 and 60 of the spiral passages 22 and 24. According to the embodiment of the invention shown in FIG. 1, the porous inert media of matrices 50 and 52 is absent from the passages 22 and 24 that contain catalytic surfaces 70a and 70b. In FIGS. 2A through 2G, catalytic surfaces 70a and 70b are represented in a cross-hatched pattern for clarity.

Figure 2C:
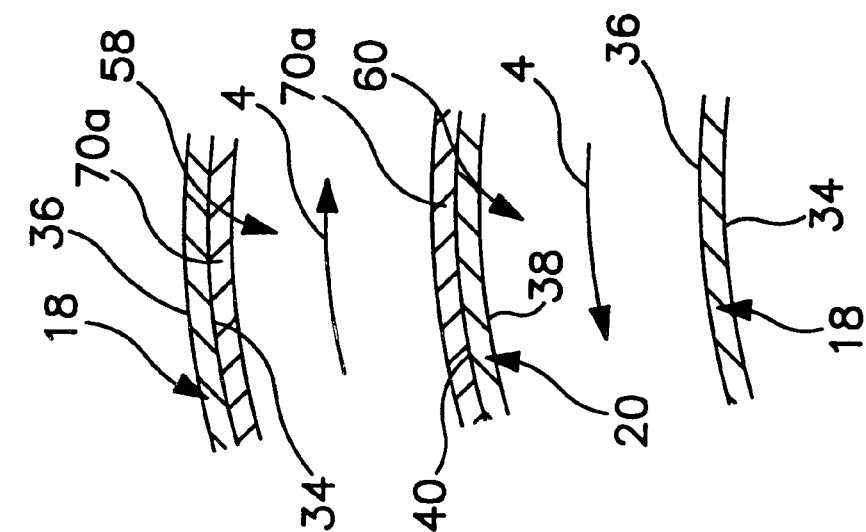
Figure 2B:
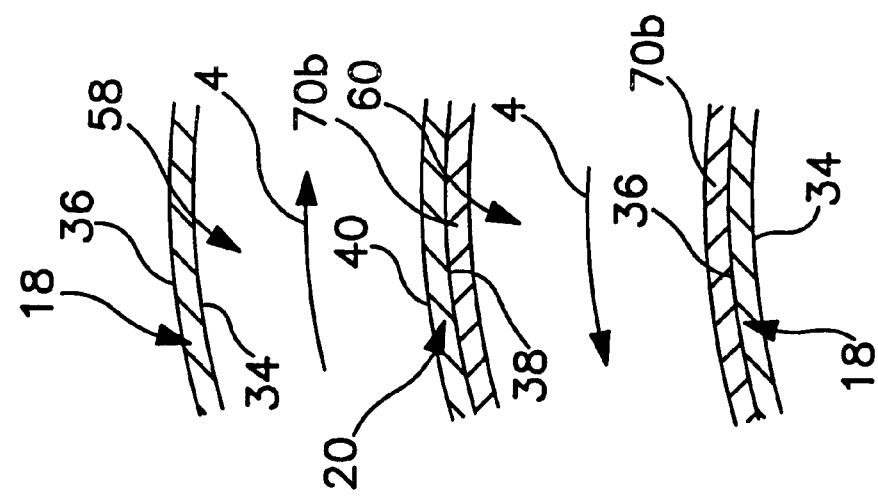
Figure 2A:
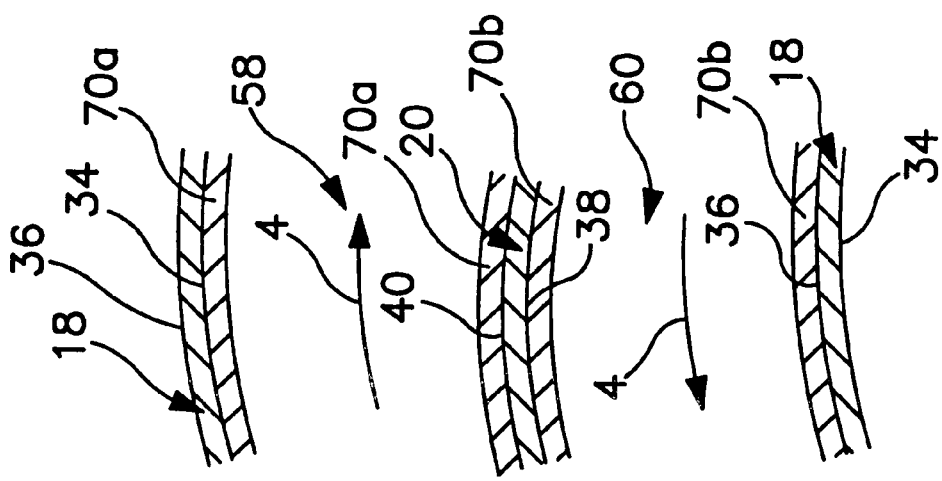

FIG. 2A shows catalytic surface 70a disposed on first sidewall concave surface 34 and second sidewall convex surface 40, and catalytic surface 70b disposed on second sidewall concave surface 38 and first sidewall convex surface 36. Catalytic surface 70a, therefore, is disposed on both the concave and convex surfaces of the low temperature region 58 of the spiral inlet passage 22, and catalytic surface 70b is disposed on both the concave and convex surfaces of the low temperature region 60 of the spiral outlet passage 24. FIG. 2B shows catalytic surface 70b disposed on first sidewall convex surface 36 and the second sidewall concave surface 38 so as to line opposing sides of spiral outer passage 24. FIG. 2C shows catalytic surface 70a disposed on first sidewall concave surface 34 and second sidewall convex surface 40 so as to line opposing sides of spiral inlet passage 22. FIG. 2D shows catalytic surface 70a disposed on first sidewall concave surface 34 so as to line the radially outward side of spiral inlet passage 22. FIG. 2E shows catalytic surface 70a disposed on second sidewall convex surface 40 so as to line the radially inward side of spiral inlet passage 22. FIG. 2F shows catalytic surface 70b disposed on the second sidewall concave surface 38 so as to line the radially outward side of spiral outlet passage 24. FIG. 2G shows catalytic surface 70b disposed on the first sidewall convex surface 36 so as to line the radially inward side of spiral outlet passage 24.

In the embodiments of the invention shown in FIG. 2A, catalyst material directly communicates with the gas stream 4 within both the spiral inlet passage 22 and the spiral outlet passage 24. In the embodiments shown in FIGS. 2C, 2D, and 2E, catalytic surface 70a directly communicates with gas stream 4 within the spiral inlet passage 22, but the spiral outlet passage 24 lacks direct contact with catalyst material (that is, these embodiments lack catalyst surface 70b). In the embodiments shown in FIGS. 2B, 2F, and 2G, catalytic surface 70b directly communicates with gas stream 4 within the spiral outlet passage 24, but the spiral inlet passage 22 lacks direct contact with catalyst material (that is, these embodiment lacks catalyst surface 70a). The term "directly communicate," as used herein and in the appended claims in conjunction with a specified passage and a surface, refers to direct contact between the specified passage and that surface, but excludes contact between the surface and the gas stream in the passages other than those expressly specified.

The length along sidewall 18 and/or 20 on which catalytic surface 70a and/or 70b are disposed will vary according to parameters associated with the particular application, including, for example, gas stream 4 inlet temperature and desired outlet temperature, gas flow rates, heat transfer characteristics of the gas, and heat transfer characteristics and configuration of the thermal oxidation and catalytic reduction system (including, for example, passage width, length, height, number of turns, and like geometric and mechanical parameters), and others, as will be understood by those familiar with such devices and applications. Further, film-injection techniques, as described herein, may enable catalytic surfaces 70a and/or 70b to maintain a temperature within the catalysts' target operating range, even while the local gas stream 4 temperature is higher, because the film injection may provide cooling. The catalyst material that forms catalytic surfaces 70a and 70b is preferably electroplated, sputtered, or applied by a series of washcoat methods onto sidewalls 18 and 20, which are preferably formed of metal, although other conventional methods of forming catalytic surfaces 70a and 70b on sidewalls 18 and 20 may be employed.

The device may be arranged such that a matrix of porous inert media is disposed on the inlet side (that is, upstream) of catalytic surface 70a in the spiral inlet passage 22, and such that a matrix of porous inert media is disposed on the outlet side (that is, downstream) of catalytic surface 70b in the spiral outlet passage 24. The design parameters of such matrices, which are not shown in the figures, may be determined by heat transfer, pressure drop, and gas characteristics (among other similar variables), as will be understood by those familiar with the particular use and with the devices and methods described herein.

Figure 3:
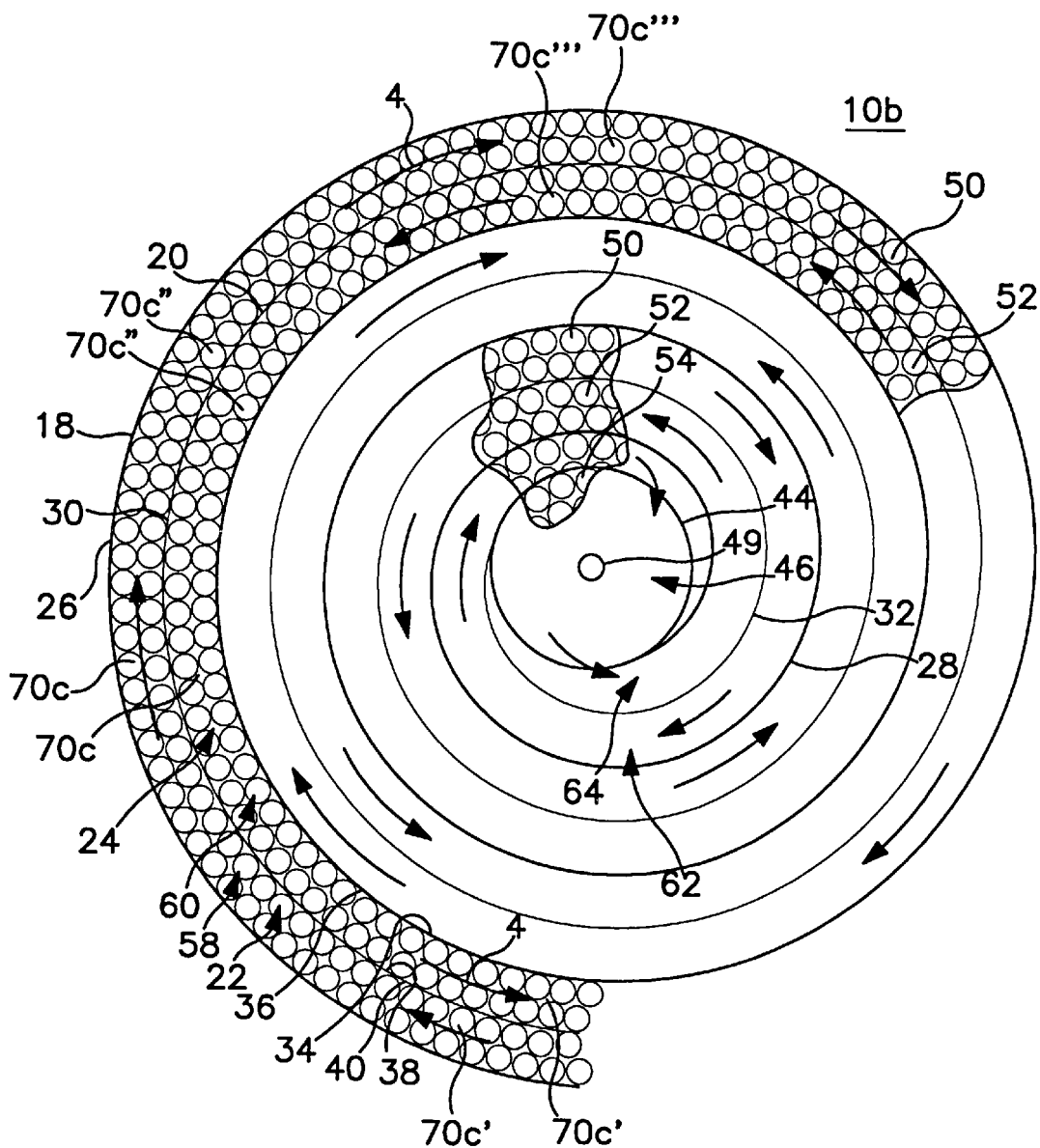
FIG. 3 is a schematic view of the thermal oxidation and catalytic reduction system according to another aspect of the present invention.

Referring to FIG. 3 to illustrate another aspect of the present invention, a thermal oxidation and catalytic reduction system 10b is structurally similar to thermal oxidation and catalytic reduction system 10a (shown in FIG. 1), except for the inlet passage matrix 50, the outlet passage matrix 52, and catalytic surfaces. In the embodiment shown in FIG. 3, matrices 50 and 52 are disposed within spiral inlet passage 22 and spiral outlet passage 24 proximate the exterior portions 26 and 28 of sidewalls 18 and 20, respectively (that is, within low temperature regions 58 and 60). A catalytic surface 70c is coated onto the media of matrices 50 and 52 to provide large contact surface area with the gas stream 4. In addition to having both matrices coated with catalytic surface 70c, the present invention encompasses having the catalytic surface 70c disposed only the spiral inlet matrix 50, only on the spiral outlet matrix 52, and any combination of matrix 50, matrix 52 and portions of the sidewalls (that is, by employing catalytic surface 70a and/or 70b as shown in FIGS. 2A through 2G). Catalytic surface 70c may be formed on the surface of the matrices 50 and/or 52 by a series of washcoat methods if the media is ceramic or other non-conducting substrate, or by electroplating if the media is metal wool or other electrically conducting substrate. Sputtering may also be used.

Referring to FIGS. 1 and 3 to illustrate another aspect of the present invention, system 10a, 10b, or 10c may employ multiple, sequentially-disposed catalytic surfaces, each of which are formed of a unique catalyst formulation. Specifically referring to FIG. 1, catalytic surface 70a comprises a first catalytic surface 70a', a second catalytic surface 70a", and a third catalytic surface 70a'''. Catalytic surfaces 70a', 70a", and 70a''' are preferably disposed angularly adjacent such that surface 70a' is disposed within spiral inlet passage 22 relatively upstream (that is, as defined by the path of gas stream 4) of surface 70a", which, in turn, is upstream of surface 70a'''. First catalytic surface 70a' may be formed of a lean-NOx catalyst formulation that has an effective temperature range that is optimized for the expected gas and surface temperatures proximate surface 70a'. Likewise surfaces 70a" and 70a''' may be formed of lean-NOx catalyst formulations having temperature ranges that are similarly optimized. For example, the catalyst forming surface 70a' may be a lean-NOx catalyst that is optimized to catalyze the reduction of NOx over a temperature range of 250° C. to 350° C., and is disposed at a location within spiral inlet passage 22 such that surface 70a' encounters temperatures approximately within that range. Surfaces 70a" and 70a''' may be optimized to catalyze the reduction of NOx over temperature ranges approximately of 350° C. to 450° C., and 450° C. to 550° C., respectively, and may be correspondingly and respectively disposed within spiral inlet passage 22 downstream of surface 70a'. Surfaces 70a', 70a", and 70a''' may be contiguous or may be disposed with gaps therebetween.

Similarly, catalytic surface 70b comprises a first catalytic surface 70b', a second catalytic surface 70b", and a third catalytic surface 70b'''. Catalytic surfaces 70b', 70b", and 70b''' are preferably disposed angularly adjacent such that surface 70b' is disposed within spiral outlet passage 22 relatively upstream of surface 70b", which, in turn, is upstream of surface 70b'''. Surfaces 70b', 70b", and 70b''' may be formed of lean-NOx catalyst formulations as described above with reference to surfaces 70a', 70a", and 70a'''.

Referring specifically to FIG. 3, catalytic surface 70c comprises a first catalytic surface 70c', a second catalytic surface 70c", and a third catalytic surface 70c'''. Catalytic surfaces 70c', 70c", and 70c''' are preferably disposed angularly adjacent such that surface 70c' is disposed within matrix 50 relatively upstream (that is, as defined by the path of gas stream 4) of surface 70c", which, in turn, is upstream of surface 70c'''. Catalytic surfaces 70c', 70c", and 70c''' are also disposed angularly adjacent within spiral outlet passage 24 such that surface 70c' is disposed within matrix 52 relatively upstream (that is, as defined by the path of gas stream 4) of surface 70c", which, in turn, is upstream of surface 70c'''. Catalytic surfaces 70c', 70c", and 70c''' may be formed of lean-NOx catalyst formations and disposed according to the descriptions referring to surfaces 70a', 70a'", 70a''', 70b', 70b", and 70b'''.

Figure 4:
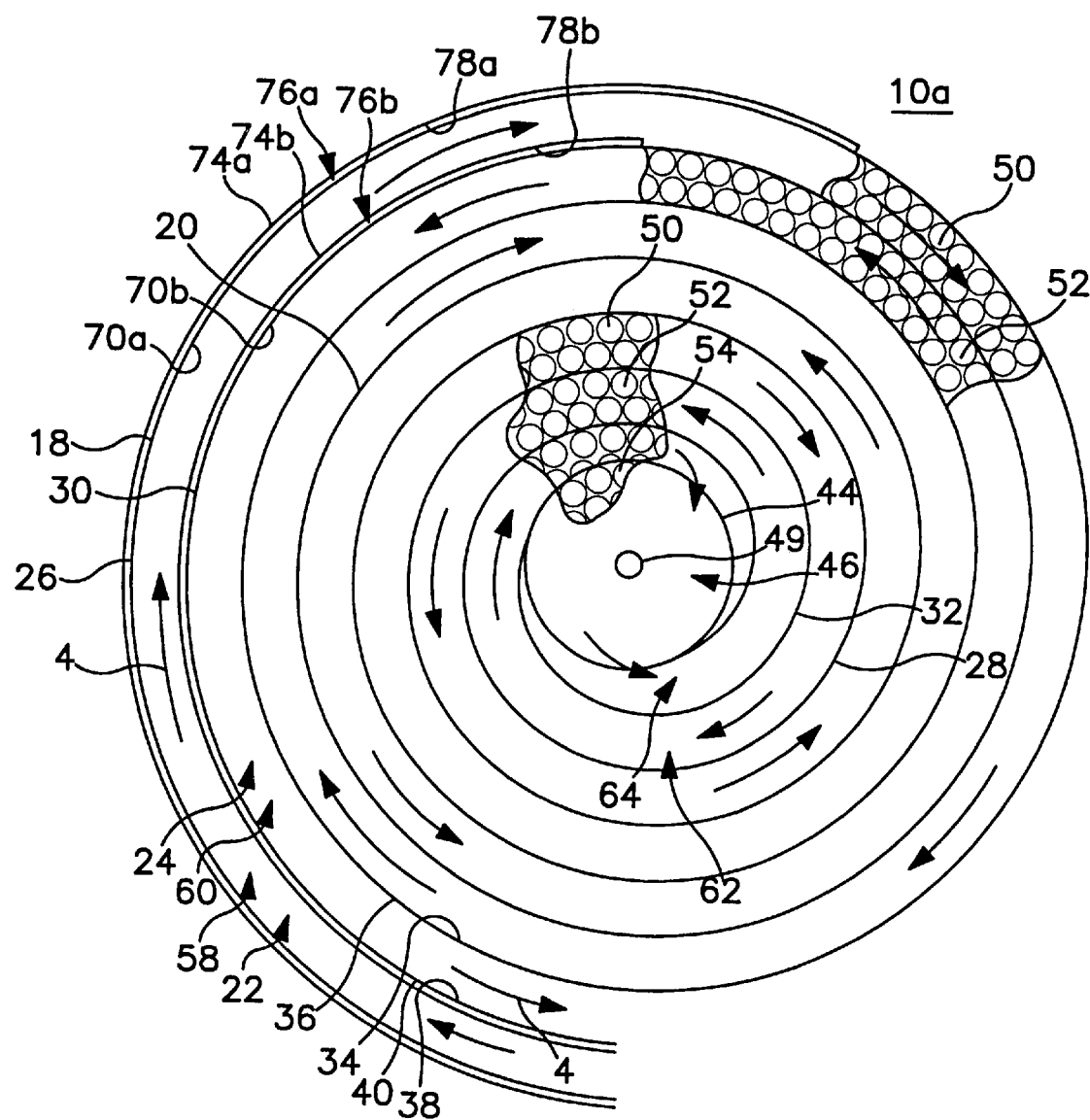
FIG. 4 is a schematic view of a thermal oxidation and catalytic reduction system according to another aspect of the present invention.
Figure 5:
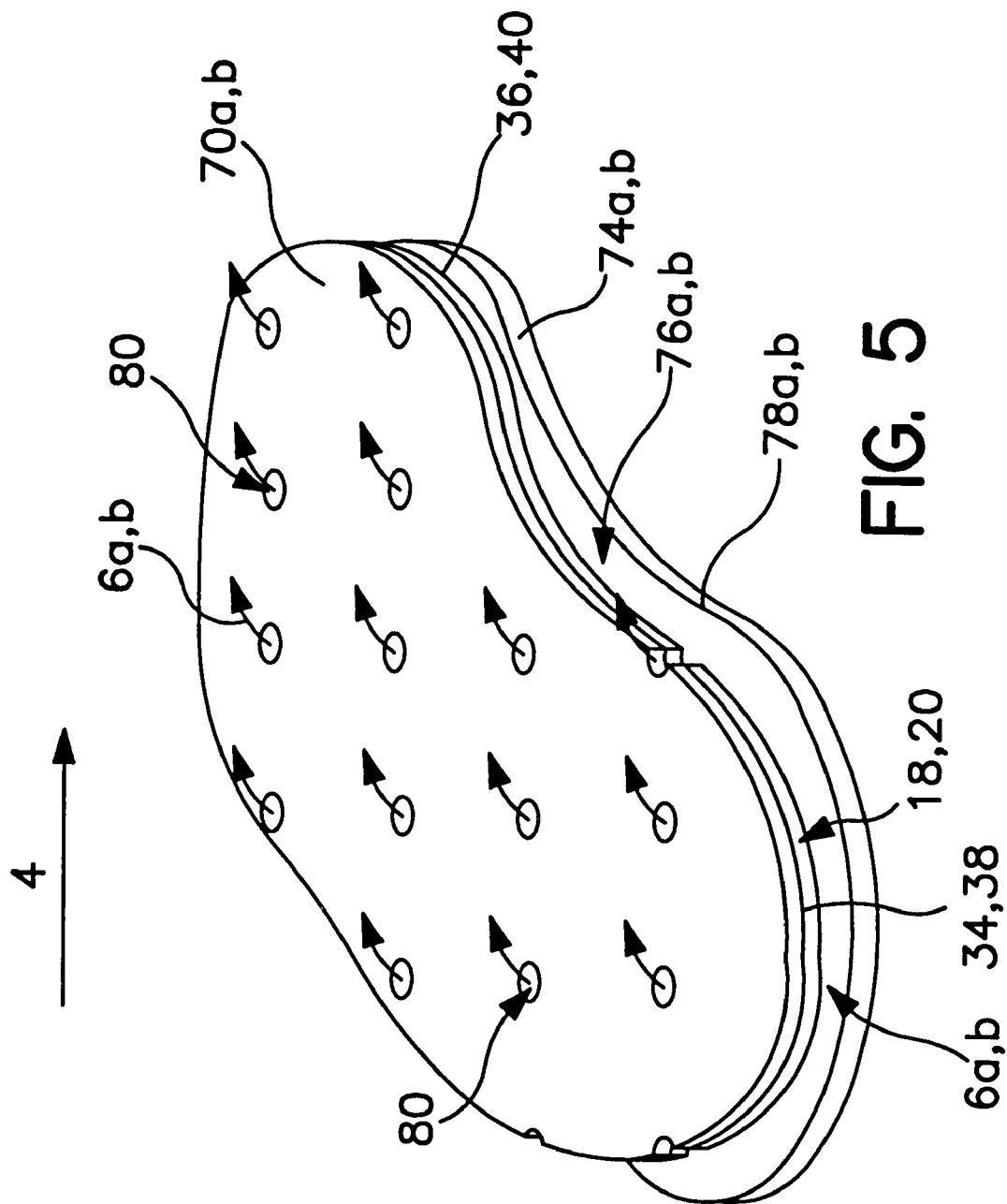
FIG. 5 is a perspective view of a portion of a sidewall of the thermal oxidation and catalytic reduction system shown in FIG. 4 to illustrate another aspect of the present invention.

According to another aspect of the present invention, a means for injecting a film of reactants proximate the catalytic surfaces 70a and/or 70b is provided. Referring specifically to FIG. 4 and FIG. 5 to illustrate a first embodiment of the film-injection means, a channel 76a enables flow of a reactant stream 6a to communicate with catalytic surface 70a, which is disposed on concave surface 34 of first wall 18. A spiral channel plate 74a is disposed substantially parallel to first side wall 18 so as to form reactant channel 76a between an inside, concave surface 78a of channel plate 74a and the convex surface 36 of first side wall 18.

Preferably, reactant channel 76a is disposed along substantially the entire length of catalytic surface 70a. Plural transpiration holes 80 are disposed through catalytic surface 70a and through first sidewall 18 such that the reactant stream 6a is in fluid communication with spiral inlet passage 22.

Similarly, another film injection means may comprise a spiral channel plate 74b that creates a reactant channel 76b. Spiral channel plate 74b is disposed substantially parallel to first sidewall 20 so as to form reactant channel 76b between an inside, concave surface 78b of channel plate 74b and the convex surface 40 of second side wall 20. Preferably, reactant channel 76b is disposed along substantially the entire length of catalytic surface 70b. Plural transpiration holes 80 are disposed through catalytic surface 70b and through second side wall 20 such that a reactant stream 6b is in fluid communication with the spiral outlet passage 24.

Channels 76a and/or 76b may be formed by suitable means for producing such a channel, including dimpling channel plate 74a and/or 74b (as is described in co-pending application Ser. No. 08/922,176), by stamping channels into one or both of plates 74a and/or 74b, by utilizing stand-offs or studs to space the plates apart, or other means, as will be understood by those familiar with such techniques. Similarly, sidewall 18 and/or 20 may be formed with dimples or channels to form channels 76a and/or 76b. Reactant streams 6a and 6b comprise reducing agents that are effective for use with the catalyst material forming catalytic surfaces 70a, 70b, and 70c. Specifically, for a lean-NOx catalyst, reactant streams 6a and 6b may include hydrogen, hydrocarbons, and/or carbon monoxide. For example, a lean-NOx catalyst has demonstrated NOx reduction in a diesel engine exhaust stream by utilizing a 10 gram per hour stream of diatomic hydrogen ["H2"] for cars, and a 20 to 50 gram per hour stream of H2 for vans and trucks. Lean-NOx catalytic surfaces 70a, 70b, and 70c may also utilize hydrogen, hydrocarbons, and carbon monoxide reactants already present in gas stream 4, or created while gas stream 4 is within the thermal oxidation and catalytic reduction system 10a, 10b, or 10c, in addition to utilizing reactants supplied by streams 6a and 6b. Further, the constituents and constituent concentrations of stream 6a may vary from those of stream 6b to optimize catalysis with the particular catalyst material used to form catalytic surfaces 70a and 70b, respectively. Providing reactant streams 6a and 6b to the thermal oxidation and catalytic reduction system may be by conventional means.

Figure 6:
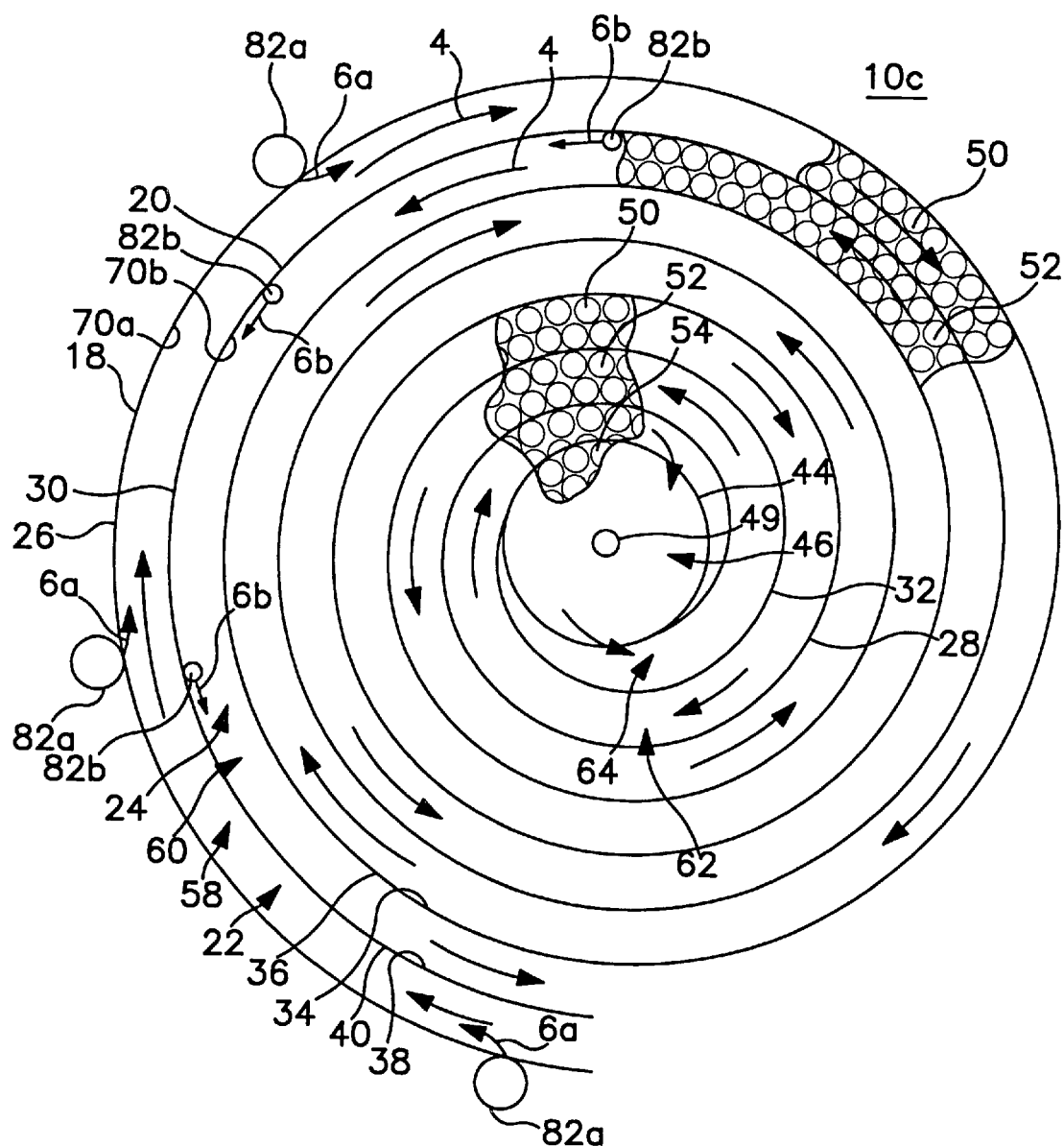
FIG. 6 is a schematic view of a thermal oxidation and catalytic reduction system according to another aspect of the present invention.

Referring to FIG. 6 to illustrate another embodiment of the film injection means, injection ports 82a are disposed proximate the concave surface 34 of first side wall 18 to enable injection of reactant stream 6a into spiral inlet passage 22 along catalytic surface 70a. Similarly, injection ports 82b may be disposed proximate the concave surface 38 of second sidewall 20 to enable injection of a reactant stream 6b into spiral inlet passage 24 along catalytic surface 70b. Injection ports 82a and 82b may be formed in a shape that promotes downstream boundary layer stability (that is, that tends to keep the boundary layer attached to catalytic surfaces 70a and 70b)—for example, an airfoil or similar tapered or non-bluff shape.

Although FIG. 6 shows three injection ports 82a and three injection ports 82b, the number and location of injection ports 82a and 82b, proximate their respective passages, will be determined according to the desired distribution of reactant stream 6a and 6b, heat transfer characteristics of the thermal oxidation and catalytic reduction system, and like parameters, as will be understood by those familiar with such film injection, film cooling and thermal oxidizing and reducing techniques. The present invention also encompasses employing conventional film injection means, as will be understood by those familiar with such meals. Further, reactant channels 76a and 76b, and/or injection ports 82a and 82b, may be employed with the embodiment of the invention shown in FIG. 3 to supply reactant streams 6a and 6b to the catalytic surface 70c. Reactant streams 6a and 6b, and the corresponding devices 76a, 76b, 82a, and 82b are omitted from FIG. 3 for clarity.

The method according to the present invention will be described in conjunction with the operation of the thermal oxidation and catalytic reduction system, using FIGS. 1, 2, and 7 for illustration. FIG. 7 illustrates a typical temperature profile of gas stream 4 within the system by providing the relationship of gas stream 4 temperature versus distance x, which is measured spirally along the path of passages 22 and 24, and, linearly across central chamber 46. FIG. 7 includes curve A, which represents operation under partial load conditions, and curve B, which represents operation under full load conditions, preferably of an internal combustion engine. Gas stream 4 may be produced, however, by an internal combustion engine (which broadly includes spark and compression ignition engines), an industrial source (which broadly includes burners, turbine combustors, boilers, furnaces, chemical reactors, nitric acid digesters, and the like), or a similar process—preferably operating under oxygen-rich conditions. Gas stream 4 includes oxides of nitrogen, oxygen, and combustible constituents, including hydrocarbons, carbon monoxide, and PM. If stoichiometrically insufficient oxygen is present in gas stream 4, which may occur especially where the present invention is employed with industrial exhaust gas streams, supplemental oxygen may be added according to known principles, and according to techniques described herein and conventional techniques.

Generally, gas stream 4 flows into spiral inlet passage 22 where it contacts catalytic surface 70a disposed of the first sidewall 18, and after oxidation occurs within the thermal oxidation zone, gas stream 4 flows into spiral outlet passage 24 where it contacts catalytic surface 70b on the convex surface 40 of the second sidewall 20. The catalytic reduction of the oxides of nitrogen is enhanced by the hydrogen, hydrocarbon, and carbon monoxide constituents of the gas streams 6a and 6b, or by those already present in gas stream 4. Therefore, the operation of the engine (for example, spark timing, injection timing, and valve timing) capable of supplying gas stream 4 may be adjusted to supply an optimum amount of such reactants to optimize NOx reduction.

Specifically, gas stream 4 flows across the catalytic surface 70a, as is represented in curve portions A1 and B1 in FIG. 7, and through matrix 50, where heat is transferred from the matrix 50 and from the sidewalls to gas stream 4, as is represented by the curve portions A2 and B2. Gas stream 4 flows from the matrix 50 into the central chamber 46, preferably where the combustible constituents, including PM and the un-reacted reducing agents, oxidize according to heat transfer and reaction principles described in co-pending application Ser. Nos. 08/922,176 and 09/072,851. The oxidation zone is represented in FIG. 7 as the relatively steeply-sloped curve portions A3 and B3. Gas stream 4 then flows through matrix 52, in which the gas stream 4 transfers heat to matrix 52 and sidewalls 36 and 38, as is represented by the curve portions A4 and B4. Gas stream 4 flows into contact with another catalytic surface 70b disposed along spiral outlet passage 24, as is represented in curve portions A5 and B5, whereby additional lean-NOx catalysis occurs, especially where reactant stream 6b is present. In FIG. 7, curve portions A2, B2, A4, and B4 have a greater slope than corresponding curve portions A1, B1, A5, and B5 to represent that matrices 50 and 52 increase the overall, local heat transfer coefficient therein.

The relatively smooth temperature profile of the curves A and B, compared with combustion processes corresponding to, for example, premixed flames, demonstrates that the present invention provides relatively long residence times of gas stream 4 within the temperature ranges corresponding to curve portions A1, B1, A2, B2, A4, B4, A5, and B5. The portions of the system that provide these temperature regions may be employed to optimize the NOx reduction process according to the methods discussed herein utilizing catalytic surfaces 70a, 70b, and 70c. Further, the long residence times at the wide range of temperatures enables the present invention to be employed with a wide variety of other emission control techniques that may require such residence times and temperatures. Further, the present invention, because of the stable oxidation conditions created therein, is well-suited to the wide variations in flow rate and temperature (approximately 70° C. to 600° C.) common to engine exhaust streams.

Under typical partial load operation of a lean-burn internal combustion engine, the temperature of gas stream 4 at the inlet of spiral inlet passage 22, which is represented as point A6, may be approximately 200° C. Under typical full load operation of a lean-burn internal combustion engine, the temperature of gas stream 4 at the inlet of spiral inlet passage 22, which is represented as point B6, may be approximately 400° C. The temperature at which the thermal oxidation reaction begins, which is represented as point A7 and B7, may be approximately 788° C. to 825° C., although these temperatures are only exemplary, and may vary widely.

Referring to FIG. 3 to illustrate another method according to the present invention, the catalytic surface 70c may be disposed on inlet matrix 50 and catalytic surface 70c may be disposed on outlet matrix 52 to reduce NOx. In the embodiment shown in FIG. 3, gas stream 4 encounters catalytic surface 70c in the spiral inlet passage 22, undergoes oxidation, and encounters catalytic surface 70c in the spiral outlet passage 24. Reactant gas streams 6a and 6b may be injected into thermal oxidation and catalytic reduction system 10c proximate catalytic surface 70c using reactant channels 76a and 76b and/or injection ports 82a and 82b, as generally described in FIGS. 4, 5, and 6.

Thermal oxidation and catalytic reduction system 10c employing catalytic surface 70c provides a temperature profile in which curves portion A1 and A2 would have substantially the same slope; likewise B1 and B2; A4 and A5; and, B4 and B5.

Another method according to the present invention will be described using FIGS. 4 and 5, and it is understood that the present method preferably may be utilized in conjunction with the method described above relating to FIG. 1. Because the lean-NOx-based catalytic reaction is enhanced by the presence of hydrogen, hydrocarbons and carbon monoxide, reactant gas streams 6a and 6b including these constituents may be injected into the spiral passages proximate catalytic surfaces 70a and 70b to enhance catalysis. Specifically, reactant gas streams 6a and 6b may be directed into reactant channels 76a and 76b and through transpiration holes 80, which may be sized and arranged to provide desired film thickness, cooling characteristics, pressure drop of the reactant stream, local velocity of the reactant stream and gas stream 4, and like parameters. Also, gas streams 6a and 6b may be injected though injection ports 82a and 82b, which may be disposed along the desired sidewall. Preferably, injection ports 82a and 82b will preferably span substantially along the height of the catalytic surfaces 70a and 70b, and inject streams 6a and 6b in a uniform profile at low Reynolds number. Regardless of the means used to inject the reactant streams 6a and 6b, it is preferred that the Reynolds Number of the flow in the boundary region of catalytic surface 70a and 70b is below approximately 1,000 so as to produce a laminar boundary layer to provide a stratified flow.

The present invention may be embodied in other specific forms without departing from the spirit or essential attributes thereof and, accordingly, reference should be made to the appended claims, rather than to the foregoing specification, as indicating the scope of the invention. Further, it is understood that the objects of the present invention are not exclusive, as other objects and advantages will be apparent to those skilled in the art.

We claim:

1. A system for reacting a gas stream comprising:

two coiled sidewalls, interspaced apart, comprising a first sidewall and a second sidewall, the first sidewall defining a concave surface and a convex surface, and the second sidewall defining another concave surface and another convex surface, each one of the coiled sidewalls having an interior portion and an exterior portion;

a spiral inlet passage, formed by the coiled sidewalls, for enabling the gas stream to pass therethrough;

a spiral outlet passage, formed by the coiled sidewalls, for enabling the gas stream to pass therethrough, the spiral outlet passage interspaced with the spiral inlet passage and in flow communication therewith;

a matrix of porous inert media, disposed in at least a portion of at least one of the spiral inlet passage and the spiral outlet passage, the matrix capable of forming a thermal oxidation reaction zone therein; and a catalytic surface for reducing oxides of nitrogen in the gas stream, wherein the catalytic surface is disposed on the concave surface of the first sidewall and the convex surface of the second sidewall; and the convex surface of the first sidewall and the concave surface of the second sidewall lack the catalytic surface, whereby the catalytic surface directly communicates with the spiral inlet passage and lacks direct contact with the spiral outlet passage.

2. A system for reacting a gas stream comprising:

two coiled sidewalls, interspaced apart, comprising a first sidewall and a second sidewall, the first sidewall defining a concave surface and a convex surface, and the second sidewall defining another concave surface and another convex surface, each one of the coiled sidewalls having an interior portion and an exterior portion;

a spiral inlet passage, formed by the coiled sidewalls, for enabling the gas stream to pass therethrough;

a spiral outlet passage, formed be the coiled sidewalls, for enabling the gas stream to pass therethrough, the spiral outlet passage interspaced with the spiral inlet passage and in flow communication therewith;

a matrix of porous inert media, disposed in at least a portion of at least one of the spiral inlet passage and the spiral outlet passage, the matrix capable of forming a thermal oxidation reaction zone therein; and a catalytic surface for reducing oxides of nitrogen in the gas stream, wherein the catalytic surface is disposed on the concave surface of the second sidewall and the convex surface of the first sidewall; and the convex surface of the second sidewall and the concave surface of the first sidewall lack the catalytic surface, whereby the catalytic surface directly communicates with the spiral outlet passage and lacks direct contact with the spiral inlet passage.

3. A system for reacting a gas stream comprising:

two coiled sidewalls, interspaced apart, comprising a first sidewall and a second sidewall, the first sidewall defining a concave surface and a convex surface, and the second sidewall defining another concave surface and another convex surface, each one of the coiled sidewalls having an interior portion and an exterior portion;

a spiral inlet passage, formed by the coiled sidewalls, for enabling the gas stream to pass therethrough;

a spiral outlet passage, formed by the coiled sidewalls, for enabling the gas stream to pass therethrough, the spiral outlet passage interspaced with the spiral inlet passage and in flow communication therewith;

a matrix of porous inert media, disposed in at least a portion of at least one of the spiral inlet passage and the spiral outlet passage, the matrix capable of forming a thermal oxidation reaction zone therein; and a catalytic surface for reducing oxides of nitrogen in the gas stream, wherein the catalytic surface is disposed on at least one of the concave surface of the first sidewall and the concave surface of the second sidewall; and the convex surface of the first sidewall and the convex surface of the second sidewall lack the catalytic surface.

4. The system of claim 3 wherein the catalytic surface is disposed on the concave surface of the first sidewall; and the convex surface of the first sidewall, the convex surface of the second sidewall, and the concave surface of the second sidewall each lack the catalytic surface, whereby the catalytic surface directly communicates with the spiral inlet passage and lacks direct contact with the spiral outlet passage.

5. The system of claim 3 wherein the catalytic surface is disposed on the concave surface of the second sidewall; and the convex surface of the first sidewall, the convex surface of the second sidewall, and the concave surface of the first sidewall each lack the catalytic surface, whereby the catalytic surface directly communicates with the spiral outlet passage and lacks direct contact with the spiral inlet passage.

6. A system for reacting a gas stream comprising:

two coiled sidewalls, interspaced apart, comprising a first sidewall and a second sidewall, the first sidewall defining a concave surface and a convex surface, and the second sidewall defining another concave surface and another convex surface, each one of the coiled sidewalls having an interior portion and an exterior portion;

a spiral inlet passage, formed by the coiled sidewalls, for enabling the gas stream to pass therethrough;

a spiral outlet passage, formed by the coiled sidewalls, for enabling the gas stream to pass therethrough, the spiral outlet passage interspaced with the spiral inlet passage and in flow communication therewith;

a matrix of porous inert media, disposed in at least a portion of at least one of the spiral inlet passage and the spiral outlet passage, the matrix capable of forming a thermal oxidation reaction zone therein; and a catalytic surface for reducing oxides of nitrogen in the gas stream, wherein the catalytic surface is disposed on the concave surface of the second sidewall; and the convex surface of the first sidewall, the concave surface of the first sidewall, and the convex surface of the second sidewall each lack the catalytic surface, whereby the catalytic surface directly communicates with the spiral outlet passage and lacks direct contact with the spiral inlet passage.

7. A system for reacting a gas stream comprising:

two coiled sidewalls, interspaced apart, comprising a first sidewall and a second sidewall, the first sidewall defining a concave surface and a convex surface, and the second sidewall defining another concave surface and another convex surface, each one of the coiled sidewalls having an interior portion and an exterior portion;

a spiral inlet passage, formed by the coiled sidewalls, for enabling the gas stream to pass therethrough;

a spiral outlet passage, formed by the coiled sidewalls, for enabling the gas stream to pass therethrough, the spiral outlet passage interspaced with the spiral inlet passage and in flow communication therewith;

a matrix of porous inert media, disposed in at least a portion of at least one of the spiral inlet passage and the spiral outlet passage, the matrix capable of forming a thermal oxidation reaction zone therein; and a catalytic surface for reducing oxides of nitrogen in the gas stream, wherein the catalytic surface is disposed on the convex surface of the first sidewall; and the concave surface of the first sidewall, the convex surface of the second sidewall, and the concave surface of the second sidewall each lack the catalytic surface, whereby the catalytic surface directly communicates with the spiral inlet passage and lacks direct contact with the spiral outlet passage.

8. A system for reacting a gas stream comprising:

two coiled sidewalls, interspaced apart, comprising a first sidewall and a second sidewall, the first sidewall defining a concave surface and a convex surface, and the second sidewall defining another concave surface and another convex surface, each one of the coiled sidewalls having an interior portion and an exterior portion;

a spiral inlet passage, formed by the coiled sidewalls, for enabling the gas stream to pass therethrough;

a spiral outlet passage, formed by the coiled sidewalls, for enabling the gas stream to pass therethrough, the spiral outlet passage interspaced with the spiral inlet passage and in flow communication therewith;

a matrix of porous inert media, disposed in at least a portion of at least one of the spiral inlet passage and the spiral outlet passage, the matrix capable of forming a thermal oxidation reaction zone therein; and a catalytic surface for reducing oxides of nitrogen in the gas stream, the catalytic surface being disposed on each one of the concave surface of the first wall, the convex surface of the second wall, the concave surface of the second wall, and the convex surface of the first wall, and wherein at least a portion of each one of the spiral inlet passage and the spiral outlet passage lacks the matrix.

9. The system of claim 1 wherein at least a portion of the spiral inlet passage lacks the matrix.

10. The system of claim 2 wherein at least a portion of the spiral outlet passage lacks the matrix.

11. The system of claim 4 wherein at least a portion of the spiral inlet passage lacks the matrix.

12. The system of claim 5 wherein at least a portion of the spiral outlet passage lacks the matrix.

13. The system of claim 6 wherein at least a portion of the spiral outlet passage lacks the matrix.

14. The system of claim 7 wherein at least a portion of the spiral inlet passage lacks the matrix.

15. A system for reacting a gas stream comprising:
two coiled sidewalls, interspaced apart, each one of the coiled sidewalls having an interior portion and an exterior portion;
a spiral inlet passage, formed by the coiled sidewalls, for enabling the gas stream to pass therethrough;
a spiral outlet passage, formed by the coiled sidewalls, for enabling the gas stream to pass therethrough, the spiral outlet passage interspaced with the spiral inlet passage and in flow communication therewith;
a matrix of porous inert media, disposed in at least a portion of at least one of the spiral inlet passage and the spiral outlet passage, the matrix capable of forming a thermal oxidation reaction zone therein; and
a catalytic surface, disposed on the exterior portion of at least one of the coiled sidewalls, for reducing oxides of nitrogen in the gas stream, wherein the catalytic surface comprises:
a first lean-NOx catalytic surface, disposed on the exterior portion of at least one of the coiled sidewalls, for reducing oxides of nitrogen in the gas stream, the first catalytic surface formed from a first formulation; and
a second lean-NOx catalytic surface, disposed on the exterior portion of at least one of the coiled sidewalls, for destroying oxides of nitrogen in the gas stream, the second catalytic surface formed from a second formulation and disposed substantially angularly adjacent the first catalytic surface;
whereby the first formulation has a first optimum temperature range for catalyzing the reduction of oxides of nitrogen and the second formulation has a second optimum temperature range for catalyzing the reduction of oxides of nitrogen.

16. The system of claim 15 further comprising:
a third lean-NOx catalytic surface, disposed on the exterior portion of at least one of the coiled sidewalls, for destroying oxides of nitrogen in the gas stream, the third catalytic surface formed from a third formulation and disposed substantially angularly adjacent the second catalytic surface, whereby the third formulation has a third optimum temperature range for catalyzing the reduction of oxides of nitrogen.

17. A system for reacting a gas stream comprising:
two coiled sidewalls, interspaced apart, each one of the coiled sidewalls having an interior portion and an exterior portion;
a spiral inlet passage, formed by the coiled sidewalls, for enabling the gas stream to pass therethrough;
a spiral outlet passage, formed by the coiled sidewalls, for enabling the gas stream to pass therethrough, the spiral outlet passage interspaced with the spiral inlet passage and in flow communication therewith;
at least one of an inlet matrix of porous inert media, disposed within the spiral inlet passage; and an outlet matrix of porous inert media, disposed within the spiral outlet passage;
a catalytic surface, disposed on at least one of the inlet matrix and the outlet matrix, for reducing oxides of nitrogen in the gas stream; and
injection means, disposed within at least one of the spiral passages, for injecting a reactant stream proximate the catalytic surface.

18. The system of claim 17 wherein the inlet matrix is disposed proximate the exterior portions the first sidewall and the second sidewall within the spiral inlet passage, and the catalytic surface is disposed on the inlet matrix.

19. The system of claim 17 wherein the spiral outlet passage has the outlet matrix disposed proximate the exterior portions the first sidewall and the second sidewall, and the outlet matrix has the catalytic surface disposed thereon.

20. The system of claim 17 wherein the catalytic surface comprises:
a first lean-NOx catalytic surface, disposed on at least one of the inlet matrix and the outlet matrix, for reducing oxides of nitrogen in the gas stream, the first catalytic surface formed from a first formulation; and
a second lean-NOx catalytic surface, disposed on at least one of the inlet matrix and the outlet matrix, for destroying oxides of nitrogen in the gas stream, the second catalytic surface formed from a second formulation and disposed substantially angularly adjacent the first catalytic surface;
whereby the first formulation has a first optimum temperature range for catalyzing the reduction of oxides of nitrogen and the second formulation has a second optimum temperature range for catalyzing the reduction of oxides of nitrogen.

21. The system of claim 20 further comprising:
a third lean-NOx catalytic surface, disposed on at least one of the inlet matrix and the outlet matrix, for destroying oxides of nitrogen in the gas stream, the third catalytic surface formed from a third formulation and disposed substantially angularly adjacent the second catalytic surface, whereby the third formulation has a third optimum temperature range for catalyzing the reduction of oxides of nitrogen.

22. A system for reacting a gas stream, comprising:
two coiled sidewalls, interspaced apart, each one of the coiled sidewalls having an interior portion and an exterior portion, each one of the coiled sidewalls forming a concave surface and a convex surface;
a spiral inlet passage, formed by the coiled sidewalls, for enabling the gas stream to pass therethrough;
a spiral outlet passage, formed by the coiled sidewalls, for enabling the gas stream to pass therethrough, the spiral outlet passage interspaced with the spiral inlet passage and in flow communication therewith;
a matrix of porous inert media, disposed in at least a portion of at least one of the spiral inlet passage and the spiral outlet passage, the matrix capable of forming a reaction wave therein;
a catalytic surface, disposed on the exterior portion of the concave surface of at least one of the coiled sidewalls, for reducing oxides of nitrogen in the gas stream; and
film-injection means, coupled to the at least one coiled sidewall, for injecting a reactant gas stream proximate the catalytic surface.

23. The system of claim 22 wherein the film-injection means comprises a spiral channel plate disposed substantially parallel to the concave surface of the at least one coiled sidewall proximate the catalytic surface, the spiral channel plate and at least one coiled sidewall forming a reactant channel therebetween.

24. The system of claim 23 wherein the film-injection means further comprises transpiration holes formed in the at least one sidewall and in the catalytic surface, the transpiration holes enabling flow communication between the reactant channel and at least one of the spiral passages.

25. The system of claim 24 wherein the at least one coiled sidewall comprises a first sidewall, the concave surface of the first sidewall defines a portion of the spiral inlet passage, and the transpiration holes enable flow communication between the reactant channel and the spiral inlet passage.

26. The system of claim 24 wherein the at least one coiled sidewall comprises a second sidewall, the concave surface of the second sidewall defines a concave portion of the spiral outlet passage, and the transpiration holes enable flow communication between the reactant channel and the spiral outlet passage.

27. The system of claim 22 wherein the film-injection means comprises at least one injection supply port, coupled to at least one of the coiled sidewalls, in fluid communication with at least one of the spiral inlet passage and spiral outlet passage, capable of injecting the reactant stream.

* * * * *

UNITED STATES PATENT AND TRADEMARK OFFICE
CERTIFICATE OF CORRECTION

PATENT NO.      : 6,282,371 B1
DATED           : August 28, 2001
INVENTOR(S)     : Richard J. Martin et al.

It is certified that error appears in the above-identified patent and that said Letters Patent is hereby corrected as shown below:

<u>Title page, Item [54] and Column 1, lines 1 & 2,</u>
Delete the title, "DEVICES FOR REDUCING EMISSIONS, AND METHODS FOR THE SAME", and insert therefor -- DEVICES FOR REDUCING EMISSIONS --.

<u>Column 1,</u>
Line 46, after "NOx", delete "presents" and insert therefor -- present --.

<u>Column 2,</u>
Line 10, after "method", delete "or" and insert therefor -- for --.
Line 60, after "or" delete "belowhte" and insert therefor -- below the --.

<u>Column 3,</u>
Line 3, after "2000 ºF" delete one closing parenthetical ")".

<u>Column 4,</u>
Line 21, after "referred to" delete "as as" and insert therefore -- as --.
Line 54, after "in" delete "an" and insert therefor -- any --.

<u>Column 5,</u>
Line 4, after "1", delete one set of the double quotation marks.
Lines 59-60, after "spiral" delete "inlet" and insert therefor -- outlet --.

<u>Column 6,</u>
Line 14, after "incorporates" delete "ircn" and insert therefor -- iron --.
Line 32, after "a" delete "cross-hatched" and insert therefor -- lined .

<u>Column 7,</u>
Line 22, between "film" and "injection" delete the hyphen "-".
Line 52, after "and", delete "28" and insert therefor -- 30 --.

<u>Column 8,</u>
Line 35, after "passage" delete "22" and insert therefor -- 24 --.
Line 36, after "relatively" delete "Upstream" and insert therefor -- downstream --.
Between lines 36-37, after "is" delete "upstream" and insert therefor -- downstream --.
Line 51, after "relatively" delete "upstream" and insert therefor -- downstream --.
Line 52, after "is" delete "upstream" and insert therefor -- downstream --.
Line 61, between "film" and "injection", delete the hyphen "-".

UNITED STATES PATENT AND TRADEMARK OFFICE
CERTIFICATE OF CORRECTION

PATENT NO.     : 6,282,371 B1
DATED          : August 28, 2001
INVENTOR(S)    : Richard J. Martin et al.

It is certified that error appears in the above-identified patent and that said Letters Patent is hereby corrected as shown below:

Column 9,
Line 10, after "to", delete "first" and insert therefor -- second --.
Line 54, after "of", delete "a".
Line 55, after "spiral" delete "inlet" and insert therefor -- outlet --.

Column 10,
Line 4, after "such" delete "meals" and insert -- means --.
Line 41, after "the" delete "convex" and insert therefor -- concave --.
Line 42, after "surface" delete "40" and insert therefor -- 38 --.

Column 11,
Line 51, after "which" delete "curves portion" and insert therefor -- curve portions --.

Column 12,
Line 2, after "injected" delete "though" and insert therefor -- through --.
Line 58, after "formed" delete "be" and insert therefor -- by --.

Column 16,
Line 51, after "a" delete "matrix⁾" and insert therefor -- matrix --.

Signed and Sealed this

Twenty-fourth Day of December, 2002

JAMES E. ROGAN
*Director of the United States Patent and Trademark Office*